US006202669B1

(12) United States Patent
Vetsch et al.

(10) Patent No.: US 6,202,669 B1
(45) Date of Patent: Mar. 20, 2001

(54) SELF-ALIGNING VALVE

(75) Inventors: Le Roy E. Vetsch, Glendale; Ira W. McNear, Jr., Phoenix, both of AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/222,634

(22) Filed: Dec. 29, 1998

(51) Int. Cl.[7] .............................. G05D 16/20; F16K 1/16

(52) U.S. Cl. ......................... 137/82; 137/625.44; 251/85; 251/299

(58) Field of Search ................................ 137/82, 625.44; 251/85, 299

(56) References Cited

U.S. PATENT DOCUMENTS

| | | | | |
|---|---|---|---|---|
| Re. 5,086 | * | 10/1872 | Zwietusch | 251/299 |
| Re. 34,261 | * | 5/1993 | Sule | 137/625.5 |
| 2,852,947 | * | 9/1958 | Klingler | 137/625.44 X |
| 2,874,929 | * | 2/1959 | Klingler | 137/625.44 X |
| 2,912,012 | * | 11/1959 | Klingler | 137/625.44 |
| 3,215,162 | | 11/1965 | Carver . | |
| 3,521,659 | * | 7/1970 | Seger | 137/625.44 X |
| 4,086,804 | | 5/1978 | Ruby . | |
| 4,131,130 | | 12/1978 | Ruby . | |
| 4,248,403 | * | 2/1981 | Scull | 251/85 |
| 4,643,391 | * | 2/1987 | Kelly | 251/85 |
| 4,715,397 | * | 12/1987 | Stearns | 137/82 X |
| 4,938,249 | * | 7/1990 | Nordeen | 137/82 |
| 5,205,532 | * | 4/1993 | Naehring | 251/85 |
| 5,207,240 | * | 5/1993 | Burrell | 137/82 |
| 5,303,897 | * | 4/1994 | Tengesdal et al. | 251/85 |
| 5,901,741 | * | 5/1999 | Mudd et al. | 251/85 X |

FOREIGN PATENT DOCUMENTS 730965 6/1955 (GB) .

* cited by examiner

*Primary Examiner*—Gerald A. Michalsky

(57) ABSTRACT

A valve, for example a valve for use in conjunction with a pneumatic pressure controller for controlling a load pressure in a volume, comprises an apparatus for aligning a pressure control valve such that a seal between at least one input port and a flapper structure is created. In particular, the pressure control valve contains a structure designed to maintain the seal between the pressure input port and the flapper structure throughout a selected range of motion of the flapper.

47 Claims, 6 Drawing Sheets

Section 1-1

SELF-ALIGNING VALVE

BACKGROUND OF THE INVENTION

1. Technical Field

The present invention relates generally to valves, and more particularly, to valve alignment to maintain a seal.

2. Background Art and Technical Problems

Air data systems, which respond to air pressure to determine various parameters such as altitude, airspeed, and the like, are common in most modem aircraft, especially large aircraft. Before air data systems are actually implemented, however, the systems are typically ground tested for operability and accuracy. Air data testers (ADTS) have become important equipment for such testing. An ADT is used to simulate the pneumatic pressures encountered at various speeds and altitudes. Typically, the ADTs are used for testing aircraft controls and calibrating instruments. For safety and efficiency, these controls and displays tend to be very accurate. Accordingly, to obtain this accuracy, the ADTs must also be highly precise, often accurate within 1 percent of the rate of change in altitude or less. Furthermore, the ADTs are preferably able to change the output pressure quickly to simulate rapid altitude changes. Examples of typical pneumatic testers are disclosed in U.S. Pat. No. 4,131,130 entitled "Pneumatic Pressure Control Valve" and issued Dec. 26, 1978 to Joseph H. Ruby and are generally described below.

FIG. 1 shows a typical configuration for existing ADT pressure control valves, examples of which are the Honeywell ADT-222B, -222C and -222D Air Data Test Systems. These ADTs are comprised of a two-input system, whereby one input supplies a positive pressure and another input supplies a negative pressure (a vacuum) which act in conjunction to produce a desired output pressure. The position of a flapper valve structure between the two input ports controls the amount of gas supplied to or withdrawn from a load volume to maintain the desired pressure.

Early designs included a single flapper alternating between covering the two ports. The single flapper design, however, results in wasted air flow as the flapper swings back and forth between the ports. A more modem flapper structure uses a dual flapper, one to cover each of the input ports. The dual flapper decreases wasted air flow in comparison to single flapper designs.

Dual flappers typically employ small gaps between the flappers and the input ports, which further decrease wasted air flow. In particular, ADTs with dual flapper pressure control valves often have gaps between the flapper structure and the input port in the range of 0.0006 inches on the exhaust (vacuum) input side, to 0.0010 inches on the pressure input side of the pressure control valve 100.

To achieve the desired pressure rapidly with such small gaps, dual flappers are commonly designed to elastically deform slightly when pressed against the respective ports. The deformation allows the gap between the opening pressure input to continue widening, while the closed pressure input remains closed, thus enabling faster pressure changes.

Deformation of the flapper, however, may result in an imperfect seal between the flapper and the port. Referring now to FIG. 2, the ideal contact between the flapper 160 and input port 120 allows no air flow, whereas the other port (not shown) remains open to facilitate air flow. In conventional dual flapper ADT systems, however, perfect seal-off occurs only at one particular point of operation, i.e., when the flappers 160 and input ports 120 are in perfect alignment.

Thus, at any other operation point, inadvertent air flow may occur through both input ports 160, resulting in wasted air, imprecise output pressure, and the slower pressure changes.

Additionally, to obtain even one point where perfect seal-off is achieved, the assembly of the pressure control valve demands extreme precision. If the flapper structure is not perfectly aligned, perfect seal-off is rarely or never achieved, disrupting the operation of the valve. To properly align the flapper, an experienced craftsman manually repetitiously adjusts and calibrates each feature of the flapper structure. Such features adjusted include, among others, the gaps, lengths, and angles of the flapper structure relative to the ports.

When actually calibrating the dual flapper pressure control valve, the craftsman first adjusts one feature of the pressure control valve, for example, the gap between the flapper and nozzle. He then tests the valve, readjusting the gap as necessary. This process is repeated several times, until the craftsman obtains the proper calibration. The craftsman then adjusts another feature, such as the angle of the flapper, and tests the valve again. However, this time, not only must the craftsman go through the adjust and test process for the angle of the flapper, he must also continually readjust the gaps, as the gaps change with adjustment of the flapper angle. The entire process is repeated many times for each feature adjusted until the entire valve structure is properly aligned. This calibration process can take anywhere from 8 to 10 hours for an experienced craftsman, to as high as 30 hours for less experienced craftsmen.

In addition, even if the one point of perfect seal-off is achieved, any position other than the perfect seal point disrupts the seal between the flapper and the nozzle. For example, referring now to FIG. 3, when the flapper makes first contact with the nozzle, a gap exists at the top of the nozzle. This is due to the angle of flapper as it moves through its range of motion. Until enough force is exerted by the torque motor to cause the flapper to begin deforming and contact the entire nozzle, perfect seal-off does not occur. Meanwhile, as the flapper deforms to seal the nozzle, the gap between the other flapper and pressure input continues to widen, thus wasting air flow, detracting from the precision of the system, and slowing the rate of pressure changes.

Further, as shown in FIG. 4, as the control system drives the flapper structure to continue widening the gap between the flapper and one nozzle, the increasing force exerted on the opposite flapper may cause the opposite flapper to deform past the point of perfect seal-off, forming a gap at the bottom of the nozzle. This gap widens as the force exerted by the torque motor increases. Again, perfect seal-off is lost.

Further, imprecision in the control system, torque motor, and flapper structure may contribute to imperfect seal-off. For example, if the control system directs too much current to the torque motor (e.g. an overdrive situation), the flapper may deform excessively and reduce the effectiveness of the seal, as shown in FIG. 3. Likewise, if the control system directs too little current to the torque motor, the flapper may not deform enough to form a full seal, as shown in FIG. 4. Improper calibration of many other components of the pressure control system may similarly affect the quality of the seal.

SUMMARY OF THE INVENTION

A valve according to various aspects of the present invention tends to maintain an effective seal even in the absence of perfect alignment of the valve components. In various embodiments, the valve is implemented in a pressure controller for controlling a load pressure. The pressure control valve has multiple pressure input ports for directing a desired output pressure through an output pressure port. In addition, the pressure control valve has a flapper structure with a torque motor connected thereto which rotates the flapper structure in a manner which opens and closes the various pressure input ports, while maintaining a seal between selected input ports and the flapper structure. The flapper assembly includes a sealing surface configured to deform with respect to the rest of the flapper as it contacts the port, thus self-aligning the flapper to the port. In an alternative embodiment, the port includes an interface which moves to maintain contact with the flapper to maintain the seal.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and:

DETAILED DESCRIPTION OF PREFERRED EXEMPLARY EMBODIMENTS

The ensuing descriptions are of preferred exemplary embodiments only, and are not intended to limit the scope, applicability, or configuration of the invention in any way. Rather, the ensuing description provides a convenient illustration for implementing a preferred embodiment of the invention. Various changes may be made in the function and arrangement of elements described in the preferred embodiments without departing from the spirit and scope of the invention as set forth in the appended claims. In addition, while the following detailed description is directed to pneumatic pressure systems for testing aircraft components, the present invention may be applicable to other valves and fluid systems, the testing of non-aircraft components, and other uses where a precise output pressure or a self-aligning seal is desired.

Figure 5:
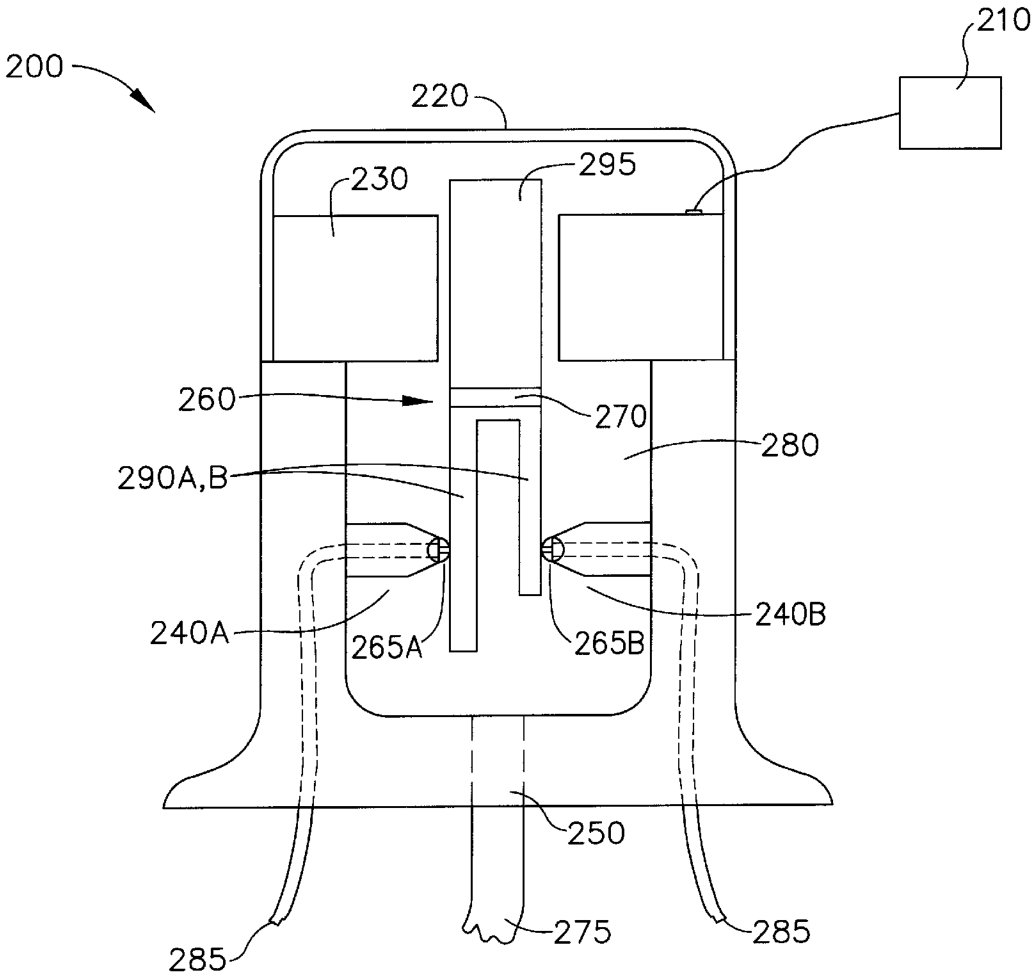
FIG. 5 illustrates a pressure control valve of according to various aspects of the present invention.

Referring to FIG. 5, a pressure control valve according to various aspects of the present invention includes: a pressure control system 210 and a self-aligning pressure control valve (PCV) 200. Pressure control system 210 receives instructions from an operator and various input signals and generates corresponding control signals to operate the PCV 200. PCV 200 responds to the control signals from the pressure control system 210 by adjusting the amount of air or other gas provided to a load volume 280 according to the signals. Pressure control system 210 may comprise any appropriate control system. One example of a pressure valve control system is disclosed in U.S. Pat. No. 4,086,804 entitled "Precision Pneumatic Pressure Supply System" and issued May 2, 1978 to Joseph H. Ruby.

PCV 200 receives the signals from the control system 210 and adjusts the amount of air provided to the load volume 280. PCV 200 according to various aspects of the present invention suitably comprises: a housing 220; a motor 230 for driving the valve; a set of pressure input ports 240A,B; a pressure output port 250; and a flapper valve structure 260. Housing 220 comprises any suitable enclosure for general protection of the other components, and may be formed of any suitable material, such as steel or plastic.

Motor 230 drives the flapper valve structure 260 according to the signals received from the control system 210. Motor 230 may comprise any suitable motor for driving the flapper valve structure 260, such as a torque motor as described U.S. Pat. No. 4,131,130. In the present embodiment, motor 230 comprises a torque motor having opposing magnetic field generators driving an armature associated with the flapper valve structure 260. Current supplied to the magnetic field generators changes the magnetic field around the armature, thus biasing the flapper valve structure 260 accordingly.

Pressure ports 240A,B, 250 provide passageways through which gas flows. The output port 250 is suitably connected to the load volume 280. The PCV 200 transfers gas to or from the load volume 280 to achieve a selected pressure or change pressure at a selected rate. In the present embodiment, the output port 250 is connected to the load volume 280 by a pneumatic connection 275. The input ports 240A,B, on the other hand, facilitate the connection of the PCV 200 to pressure sources, such as a high pressure supply and a low pressure supply (typically a near-vacuum), for example via pneumatic connections 285. The pressure of the load volume 280 may then be set at virtually any pressure between the pressures of the high pressure supply and the low pressure supply by controlling the operation of the PCV 200.

Flapper valve structure 260 moves in response to the motor 230 to open and close the input ports 240A,B and thus control the gas stored in the load volume 280. Generally, the flapper valve structure 260 may comprise any suitable flapper valve structure responsive to the motor 230 to open and close the input ports 240A,B. In the present embodiment, the flapper valve structure 260 comprises: an armature 295 for responding to the motor 230; a mounting member 270; and at least one flapper member 290 to open and close the input ports 240A,B.

The mounting member 270 provides a physical connection between the interior of the housing 220 and the flapper valve structure 260, and may comprise any suitable mechanism for supporting the flapper valve structure 260. The mounting member 270 is resilient to accommodate movement of the armature 295 and the flapper member 290. In the present embodiment, the mounting member 270 is manufactured from flat spring materials such as beryllium copper, spring steel, or other similar materials, and is secured to the housing 220 via standard fasteners such as epoxy, screws, or the like. The armature 295 and the flapper 290 are suitably secured substantially rigidly to the center of the mounting member 270. The flat configuration of the mounting member 270 allows for substantial rigidity in a translational direction, yet still allows resilient rotational movement around its lateral axis.

Force is applied to the flapper valve structure 260 via the armature. The armature 295 may comprise any suitable mechanism for applying force to the flapper member 290 in response to the motor 230. In the present embodiment, the armature 295 is responsive to the changing magnetic field generated by the motor 230. For example, the armature 295 suitably comprises an elongated core disposed within the motor 230. The flapper member 290 and armature 295 are typically fabricated from a suitable ferromagnetic material, such as Nispan-C, cold rolled steel, spring steel, or other iron alloys and the like.

The flapper member 290 moves laterally to close and open the input ports 240A,B in response to force applied to the flapper member 290 by the motor 230 via the armature 295. Thus, the pressure within the load volume 280 may be controlled by closing or narrowing a gap 105A between the flapper member 290 and the first input port 240A, while opening or widening a second gap 240B between the flapper member 290 and the second input port 240B, and vice versa. By moving the flapper member 290 back and forth between the input ports 240A,B, gas may be selectably supplied to or withdrawn from the load volume 280.

The flapper member 290 may comprise any appropriate mechanism for controlling the flow of gas through the input ports 240A,B. For example, the flapper member 290 may comprise a single, rigid flapper connected to the mounting member 270. Alternatively, flapper member 290 may comprise a dual flapper, such as a tuning fork shaped flapper or a dual offset flapper. A tuning fork shaped flapper is typically comprised of two rectangular members extending down and away from the mounting member 270 and the motor 230. One member may be longer than the other in order to avoid the harmonic effects which appear with a conventional tuning fork configuration. Similarly, the dual offset flapper suitably includes two such rectangular members, but instead of each flapper being directly opposite the other, the flappers are offset. Suitable examples of both the tuning fork and dual offset configurations are disclosed in U.S. Pat. No. 4,131, 130.

The present embodiment employs dual flappers 290A, B. The widths, thicknesses, lengths, and materials of the flappers 290A, B are suitably selected so as to have a predetermined spring constant with respect to rotational forces around the mounting member 270. Each flapper 290A, B extends past the corresponding input port 240A,B, and is separated from the input port 240A,B by a predefined gap 265A,B. The gaps 265A,B are typically quite small; usually 0.0010 inches or less.

In the present embodiment, substantially sealing contact between at least one of the flappers 290A, B and the corresponding input port is facilitated by a shifting seal. As the flapper 290A, B contacts the corresponding input port 240A,B, the shifting seal moves to form a more effective seal. Thus, the shifting seal tends to conform to the relative positions of the flappers 290A, B and the input ports 240A,B.

Figure 6A:
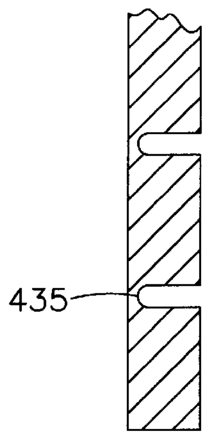
FIG. 6*a,b* are a cross-sectional detailed views of a preferred embodiment of a self-aligning flapper pad.
Figure 6B:
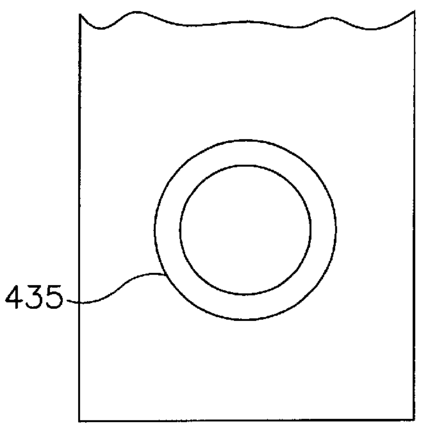
Figure 7A:
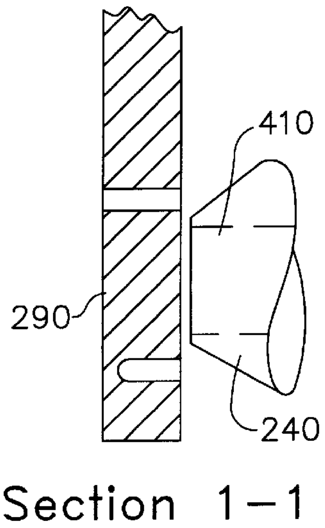
FIG. 7*a,b* are a cross-sectional detailed views of another preferred embodiment of a self-aligning flapper pad.
Figure 7B:
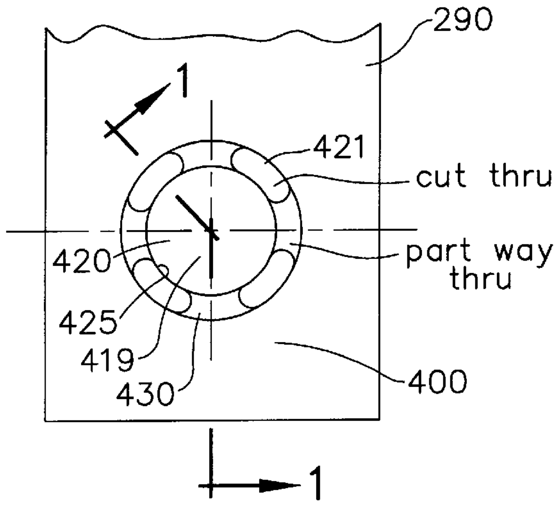

The shifting seal may be implemented in any suitable manner. Referring now to FIG. 6*a* and 6*b*, the shifting seal may be integrated into the flapper 290A, B. In the present embodiment, the shifting seal comprises a sealing surface 419 and a movable mount 421. The sealing surface 419 forms the contact between the flapper 290 and the input port 240, and the movable mount 421 facilitates movement of the sealing surface 419 upon contact with the input port 240.

For example, the sealing surface 419 in the present embodiment comprises a flapper pad 420. The flapper pad 420 is suitably slightly larger in diameter than an aperture 410 of the input port 240. The flapper pad 420 may comprise a separate component attached to the flapper 290, or may be integrally formed in the flapper material. In the present embodiment, the flapper pad 420 is integrated into the material of the flapper 290, and the movable mount 421 is suitably formed by a groove, such as an annular groove 400, defining the flapper pad 420 and allowing the flapper pad 420 to deflect a selected amount from the surface plane of the flapper 290. The depth of the annular groove 400 may be selected according to the material of the flapper 290 and the desired amount of flexibility of the movable mount 421. In the present embodiment, the depth of the annular groove 400 is approximately 60 to 80 percent of the thickness of the flapper 290.

Figure 8:
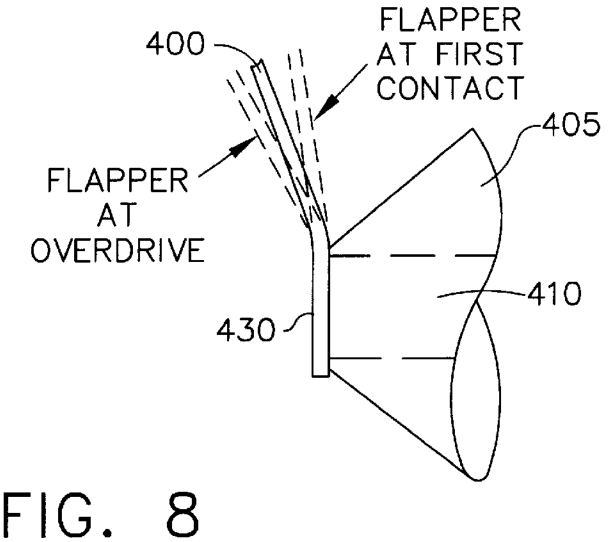
FIG. 8 is a detailed view of a self-aligning flapper pad contacting a pressure port.

Referring now to FIG. 8, annular groove 400 facilitates movement of flapper pad 420 with respect to flapper 290. In particular, the remaining material 435 following formation of the annular groove 400 tends to substantially elastically deform such that when flapper 290 contacts input port 240, flapper pad 420 remains in substantially sealing contact with input port 240. The deformation tends to create and maintain a substantial seal between flapper pad 420 and input port 240 throughout the rotation of flapper 240.

For example, still referring to FIG. 8, when self-aligning flapper 290 first makes contact with input port 240, remaining material 435 deforms such that flapper pad 420 tends to mate with input port 405 and substantially seal the flapper pad 420 to input port 240. As flapper member 290 continues rotating, remaining material 435 continues to deform such that flapper pad 420 remains in contact with input port 240. Further, as motor 230 continues the rotation of flapper structure 290, flapper 290 continues to deform. However, the continuing deformation of the remaining material 435 tends to maintain the seal between input port 240 and flapper pad 420.

The movable mount 421 may be configured in any suitable manner to facilitate movement of the sealing surface 419. For example, referring now to FIG. 6*b*, additional flexibility of the movable mount 421 may be provided by forming perforations through the flapper 290 in the annular groove 400, such that a the flapper pad 420 is supported by one or more supports 430. In one embodiment, flapper pad 420 is suitably supported by a plurality of webs, such as four equidistant webs 430. Any suitable number of supports 430, however, such as one, two, three, or more supports spaced equally or unequally around flapper pad 420 may be appropriate in various applications or in conjunction with various materials. In addition, variations in the size, depth, material or other physical characteristics of flapper pad 420, annular ring 400, and web supports 430 may likewise be preferable. For example, depending on the application and materials used in PCV 200, annular ring 400 may be formed on a side of self-aligning flapper 290 contacting pressure input 405A, B, or on a side of flapper 290 opposite input 405A,B. The configuration of the flapper pad 420 and movable mount 421 may be further selected according to the anticipated deformation of flapper pad 420, the force applied by motor 230, the spring stiffness of flapper 290, and/or any other appropriate characteristics.

Figure 9:
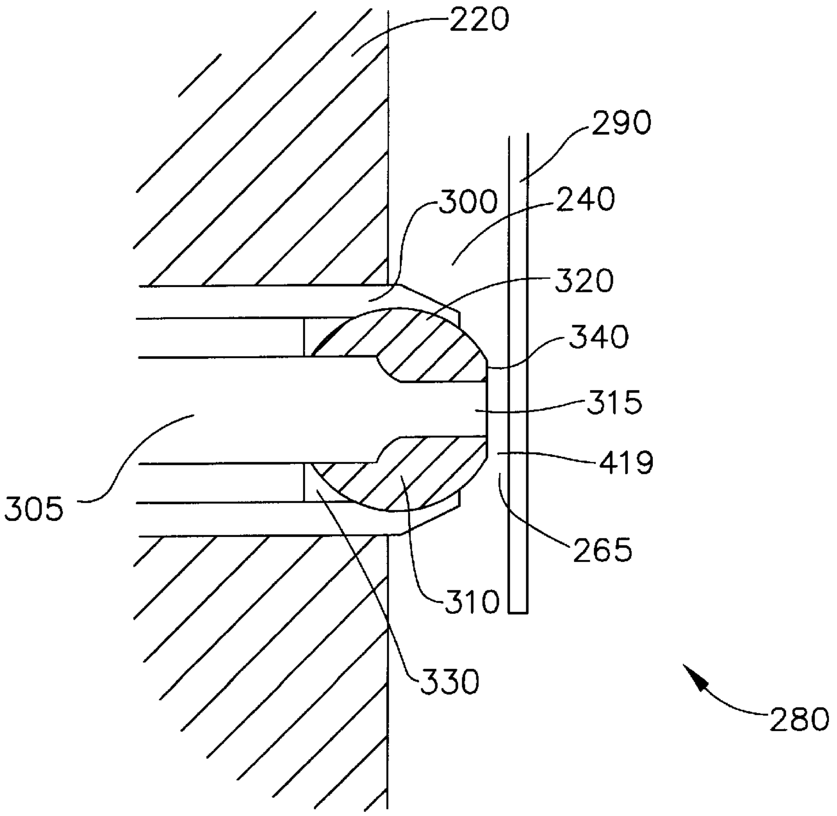
FIG. 9 is a cross-sectional view of a rotatable self-aligning pressure port
Figure 10A:
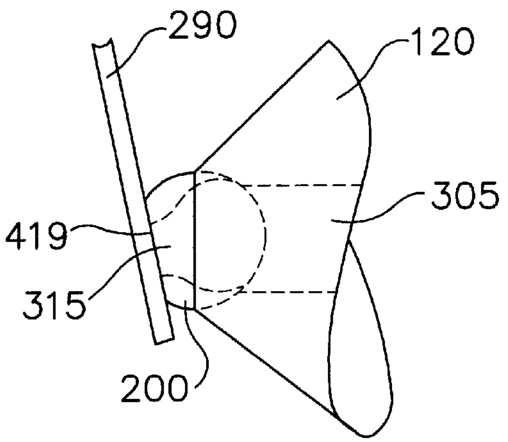
FIG. 10*a* is a cross-sectional detailed view of a standard flapper at first contact with a rotatable self-aligning pressure port.
Figure 10B:
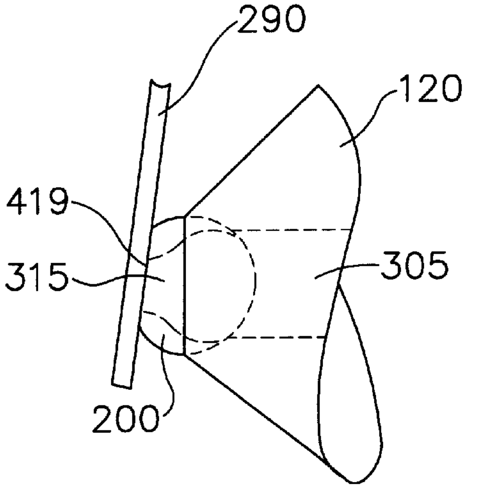
FIG. 10*b* is a cross-sectional detailed view of a standard flapper in overdrive contact with a rotatable self-aligning pressure port.

Alternatively, the sealing surface 419 and movable mount 421 may be implemented on components other than the flapper 290. For example, the sealing surface 419 and movable mount 421 may be implemented in conjunction with the input port 240A,B. Referring now to FIG. 9, a self-aligning input port 240 suitably comprises a nozzle 300 having a spherical endpiece 310 mounted on housing 220. Flapper 290 suitably extends past rotating spherical endpiece 310 and is separated from the spherical endpiece 310 by predetermined gap 265. Nozzle 300 includes an aperture 305 through which air or any other appropriate fluid may flow. At an end of nozzle 300 extending into load volume 280, a cavity 320 is formed for receiving spherical endpiece 310. Cavity 320 is suitably configured such that spherical endpiece 310 fits snugly and rotatably within the cavity 320.

Spherical endpiece 310 is typically formed from any rigid material, but is preferably formed from a material of greater hardness than flapper 290 to increase the life expectancy of PCV 200. In the preferred embodiment, spherical endpiece 310 is made from materials such as tungsten carbide, stainless steel, or the like, and is preferably formed from a stainless steel alloy.

Spherical endpiece 310 contains an aperture 315 designed to substantially align with aperture 305 of nozzle 300 when spherical endpiece 310 is inserted into cavity 320. Endpiece aperture 315 is suitably formed with a narrower diameter at an exit extending into load volume 280, and a wider diameter at the opposite end of spherical endpiece 310. This configuration allows the free flow of air or other fluid through input port 240 and nozzle 300 as spherical endpiece 310 rotates. In the preferred embodiment of the present invention, the narrow end of aperture 315, which contacts flapper 290, measures 0.042 inches on the pressure input side, and 0.068 inches on the exhaust (vacuum) side, though these values may change depending on the particular application of PCV 200. Spherical endpiece 310 further suitably includes a substantially flat surface 340 substantially perpendicular to apertures 305, 315, located at the narrower exit of aperture 315 to form sealing surface 419 for contacting flapper 290.

The movable mount 421 is formed by the interface between spherical endpiece 310 and cavity 320. Spherical endpiece 310 is inserted into cavity 320 such that aperture 315 of spherical endpiece 310 is in substantial coaxial alignment with aperture 305 of nozzle 300. A retaining flap 330 is formed behind spherical endpiece 310 to prevent removal and/or translational movement of spherical endpiece 310, yet still allow rotational movement of spherical endpiece 310.

Figure 1:
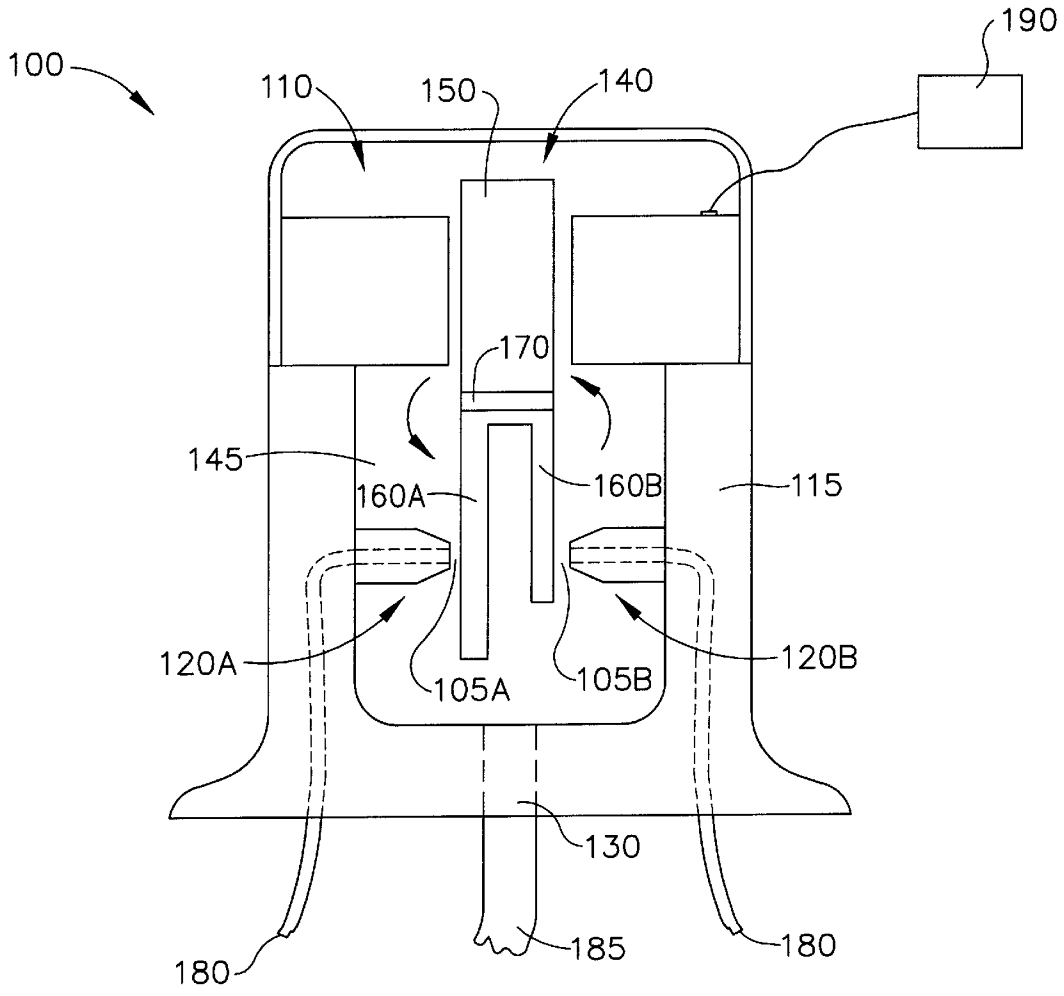
FIG. 1 (PRIOR ART)
FIG. 1 illustrates a typical dual flapper pressure control valve.
Figure 2:
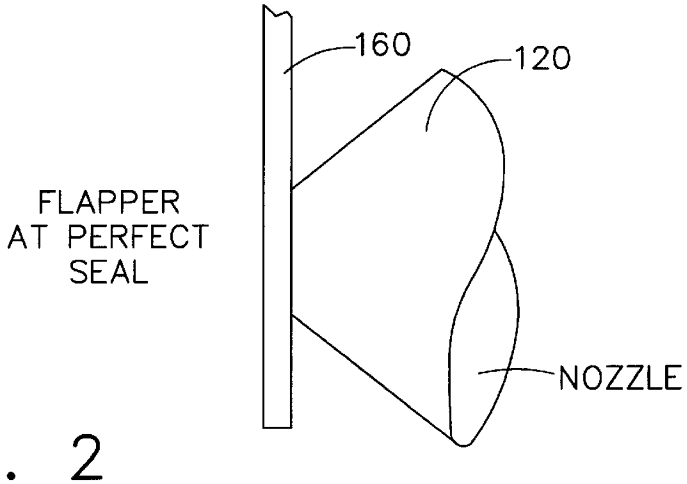
FIG. 2 illustrates a flapper and input port at perfect seal-off.
Figure 3:
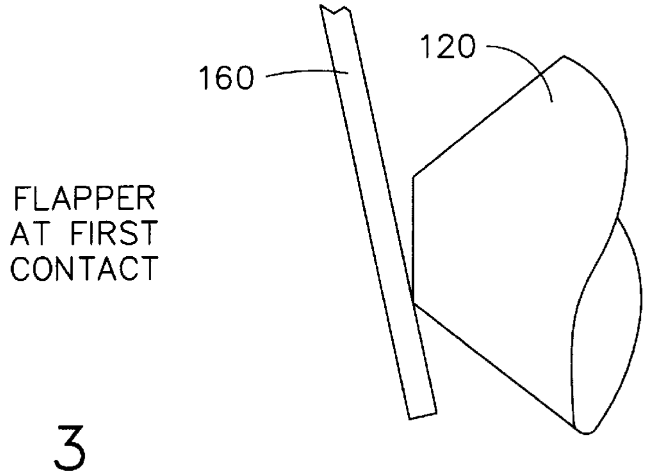
FIG. 3 illustrates a flapper and input port at first contact.

In the present exemplary embodiment, both pressure inputs 240A,B contain spherical endpiece 310. With reference to FIG. 9*a*, when flapper 290 first contacts spherical endpiece 310 at its flat surface 340 (similar to FIG. 3), spherical endpiece 310 rotates within cavity 320 such that flat surface 340 aligns with flapper 290 and tends to create a seal.

Figure 4:
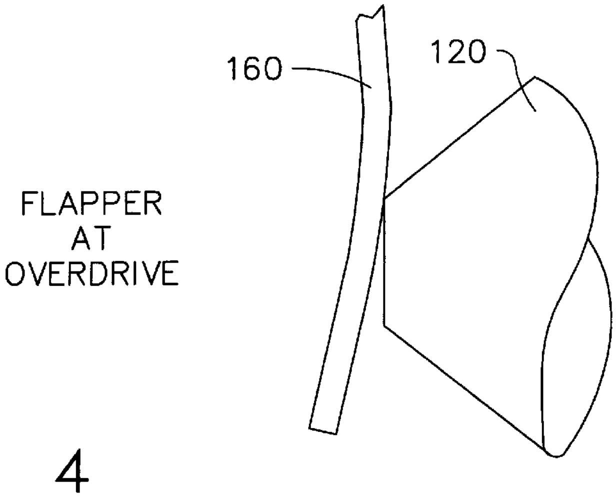
FIG. 4 illustrates a flapper and input port when excess force is applied to the flapper.

Referring to FIG. 9*b*, as flapper 290 continues rotating, spherical endpiece 310 and flat surface 340 remain in contact with flapper 290, such that the seal between flapper 290 and spherical endpiece 310 is maintained throughout the rotation of flapper 290. Additionally, as described above, as motor 230 continues the rotation of flapper structure 260, flapper 290 continues to deform. However, the continuing rotation of spherical endpiece 310 tends to maintain the seal between nozzle 300 and flapper 290 instead of allowing a gap to appear at the lower end of input 240 as in FIG. 4.

Referring again to FIG. 5, PCV 200 may be operated to maintain a selected pressure within the load volume 280. A pressure corresponding to a selected altitude, speed, mach number, or the like is entered into control system 210, which sends a corresponding signal to the motor 230. The motor 230 causes the flapper structure 260 to move with respect to input ports 240A,B, for example by changing a magnetic field to exert force upon the armature 295. The force causes the flapper structure 260 to rotate about its axis, causing the flapper structure 260 to close one pressure port while opening the other, allowing fluid to enter or exit the load volume 280. In the present embodiment, the typical stroke length through which flapper structure 260 passes through remains 0.0112 inches as in previously existing dual flapper pressure control valves, but may vary from this measurement as necessary. A suitable feedback system (not shown) from the load volume 280 to the control system 210 may monitor the pressure and other conditions in the load volume 280 and indicate when the desired pressure is attained.

Additionally, in order to rapidly change the output pressure, torque motor 230 continues rotating flapper structure 260 such that the closing flapper 290 deforms. The sealing surface 419 moving on the movable mount 421 tends to maintain the seal between one flapper 290 and the closed input port 240A,B, while the gap 265 between the opposite flapper 290 and opposite input 240 continues to widen. In the preferred embodiment of the present invention, in PCV's 200 neutral position, the typical gap between flapper 290 on the vacuum input side and input 240 remains 0.0006 inches, and between flapper 290 on the pressure input side and input 240 remains 0.0010 inches. However, these gaps may be selected depending on the particular configuration of PCV 200.

When the feedback system indicates that the pressure in the load volume 280 is at or approaching the target pressure, control system 210 adjusts the force applied by motor 230 to close the widened gap and open the closed gap until the desired pressure is achieved.

Thus, the present invention suitably provides a self-aligning valve which tends to maintain a seal between flapper 290 and pressure inputs 240A,B. Maintaining a seal throughout the contact between flapper 290 and inputs 240A,B, tends to diminish wasted airflow. Further, assembly of PCV 200 is greatly simplified because undesirable effects of imperfections in the assembly and alignment of the valve may be reduced. Finally, the self-aligning pressure valve increases the precision of the overall system by maintaining a seal throughout the rotation of flapper valve structure 260.

While the principles of the invention have been described in illustrative embodiments, many modifications of structure, arrangements, proportions, the elements, materials and components, used in the practice of the invention may be varied and particularly adapted for a specific environment and operating requirements without departing from those principles.

What is claimed is:

1. A valve having a closed position and an open position, comprising:

a port having an aperture;

a sealing member adjacent the port, wherein the sealing member opens the aperture when the valve is in the open position and covers the aperture when the valve is in the closed position;

a sealing surface disposed between the port and the sealing member to form a seal between the port and the sealing member when the valve is in the closed position; and a movable mount supporting the sealing surface to facilitate movement of the sealing surface with respect to at least one of the port and the sealing member, the movable mount comprising a flapper pad having a groove formed in the sealing member around the sealing surface, the flapper pad being configured to contact the port when the valve is in the closed position.

2. A valve according to claim 1, wherein the movable mount moves according to the relative positions of the port and the sealing member.

3. A valve according to claim 1, wherein the sealing member includes at least one flapper member configured to move according to the open position and the closed position of valve.

4. A valve according to claim 3, wherein the sealing surface comprises a flapper pad integrated into the flapper member.

5. A valve according to claim 4, wherein the groove is formed in the flapper member around the flapper pad.

6. A valve according to claim 4, wherein the movable mount comprises at least one perforation formed in the flapper member around the flapper pad.

7. A valve according to claim 3, wherein the sealing surface comprises a flapper pad mounted on the flapper member.

8. A valve according to claim 7, wherein the movable mount comprises a deformable mount attached to the flapper member and supporting the flapper pad.

9. A valve according to claim 3, wherein the sealing member comprises a single rigid flapper.

10. A valve according to claim 3, wherein the sealing member comprises a dual flapper, the dual flapper comprising one of either a tuning fork configuration and an offset configuration.

11. A valve according to claim 1, wherein the groove has a depth selected according to a desired resilience of the movable mount.

12. A valve according to claim 1, wherein the movable mount comprises at least one perforation formed in the sealing member around the sealing surface.

13. A valve, comprising:

a port;

a flapper valve structure disposed adjacent the port, wherein the flapper valve structure has an open position and a closed position; and a shifting seal disposed between the port and the flapper valve structure, including:

a sealing surface, wherein the sealing surface forms a seal between the flapper valve structure and the port when the flapper valve structure is in the closed position; and a movable mount formed between the sealing surface and at least one of the flapper valve structure and the port, wherein the movable mount facilitates movement of the sealing surface relative to the at least one of the flapper valve structure and the port, the movable mount comprising a groove formed in the flapper valve structure around the sealing surface.

14. A valve according to claim 13, wherein the shifting seal shifts according to the relative positions of the port and the flapper valve structure.

15. A valve according to claim 13, wherein the flapper valve structure includes at least one flapper member configured to move according to the open position and the closed position of the flapper valve structure.

16. A valve according to claim 15, wherein the sealing surface comprises a flapper pad integrated into the flapper member.

17. A valve according to claim 16, wherein the groove is formed in the flapper member around the flapper pad.

18. A valve according to claim 16, wherein the movable mount comprises at least one perforation formed in the flapper member around the flapper pad.

19. A valve according to claim 15, wherein the sealing surface comprises a flapper pad mounted on the flapper member.

20. A valve according to claim 19, wherein the movable mount comprises a deformable mount attached to the flapper member and supporting the flapper pad.

21. A valve according to claim 15, wherein the flapper valve structure comprises a single rigid flapper.

22. A valve according to claim 15, wherein the flapper valve structure comprises a dual flapper, wherein the dual flapper is configured in one of either a tuning fork configuration and an offset configuration.

23. A valve according to claim 13, wherein the groove has a depth selected according to a desired resilience of the movable mount.

24. A valve according to claim 13, wherein the sealing surface includes a flapper pad configured to contact the port when the flapper valve structure is in the closed position.

25. A valve according to claim 13, wherein the movable mount comprises at least one perforation formed in the flapper valve structure around the sealing surface.

26. A pressure control system for controlling the pressure applied to a load volume, comprising:

a port configured to be connected to a pressure source;

a valve member configured to selectably open and close the port, the valve member having at least one flapper member configured to move according to the open position and the closed position of the valve member;

a sealing surface disposed between the port and the valve member, wherein the sealing surface forms a seal between the valve member and the port when the valve member is in a closed position; and a movable mount formed between the sealing surface and at least one of the flapper member and the port, wherein the movable mount facilitates movement of the sealing surface relative to the at least one of the flapper member and the port, the movable mount comprising a groove formed in the flapper member around the sealing surface.

27. A valve according to claim 26, wherein the movable mount moves according to the relative positions of the port and the valve member.

28. A valve according to claim 26, wherein the sealing surface comprises a flapper pad integrated into the flapper member.

29. A valve according to claim 28, wherein the groove formed in the flapper member around the flapper pad.

30. A valve according to claim 28, wherein the movable mount comprises at least one perforation formed in the flapper member around the flapper pad.

31. A valve according to claim 26, wherein the sealing surface comprises a flapper pad mounted on the flapper member.

32. A valve according to claim 31, wherein the movable mount comprises a deformable mount attached to the flapper member and supporting the flapper pad.

33. A valve according to claim 26, wherein the valve member comprises a single rigid flapper.

34. A valve according to claim 26, wherein the valve member comprises a dual flapper, wherein the dual flapper is configured in one of a tuning fork configuration and an offset configuration.

35. A valve according to claim 26, wherein the groove has a depth selected according to a desired resilience of the movable mount.

36. A valve according to claim 26, wherein the sealing surface includes a flapper pad configured to contact the port when the valve member is in the closed position.

37. A valve according to claim 26, wherein the movable mount comprises at least one perforation formed in the valve member around the sealing surface.

38. A valve having a closed position and an open position, comprising:

a port having an aperture;

a sealing member adjacent the port, the sealing member opening the aperture when the valve is in the open position and covering the aperture when the valve is in the closed position;

a sealing surface disposed between the port and the sealing member to form a seal between the port and the sealing member when the valve is in the closed position; and a movable mount supporting the sealing surface to facilitate movement of the sealing surface with respect to at least one of the port and the sealing member, the movable mount comprising at least one perforation formed in the sealing member around the sealing surface.

39. A valve according to claim 38, wherein the sealing surface includes a flapper pad configured to contact the port when the valve is in the closed position.

40. A valve according to claim 38, wherein the movable mount moves according to the relative positions of the port and the sealing member.

41. A valve according to claim 38, wherein the sealing member includes at least one flapper member configured to move according to the open position and the closed position of valve.

42. A valve according to claim 41, wherein the sealing surface comprises a flapper pad integrated into the flapper member.

43. A valve according to claim 42, wherein the perforation is formed in the flapper member around the flapper pad.

44. A valve according to claim 41, wherein the sealing surface comprises a flapper pad mounted on the flapper member.

45. A valve according to claim 44, wherein the movable mount comprises a deformable mount attached to the flapper member and supporting the flapper pad.

46. A valve according to claim 41, wherein the sealing member comprises a single rigid flapper.

47. A valve according to claim 41, wherein the sealing member comprises a dual flapper, wherein the dual flapper is configured in one of either a tuning fork configuration and an offset configuration.

* * * * *